(12) United States Patent
Lee et al.

(10) Patent No.: US 12,737,599 B2
(45) Date of Patent: Sep. 15, 2026

(54) NEUROMORPHIC DEVICE AND UNIT SYNAPSE DEVICE FORMING THE SAME

(71) Applicant: POSTECH Research and Business Development Foundation, Pohang-si (KR)

(72) Inventors: Chul Jun Lee, Pohang-si (KR); Hyun Sang Hwang, Daegu (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 1271 days.

(21) Appl. No.: 17/584,302

(22) Filed: Jan. 25, 2022

(65) Prior Publication Data

US 2022/0366227 A1 Nov. 17, 2022

(30) Foreign Application Priority Data

May 13, 2021 (KR) ........................ 10-2021-0062037

(51) Int. Cl.
*G06N 3/00* (2023.01)
*G06N 3/063* (2023.01)

(52) U.S. Cl.
CPC .................................... *G06N 3/063* (2013.01)

(58) Field of Classification Search
USPC ................................ 716/100, 110, 137, 138
See application file for complete search history.

(56) References Cited

FOREIGN PATENT DOCUMENTS

| | | | |
|---|---|---|---|
| JP | 2004273480 A | * | 9/2004 |
| JP | 2021106262 A | * | 7/2021 |

* cited by examiner

*Primary Examiner* — Brian Ngo
(74) *Attorney, Agent, or Firm* — Morgan, Lewis & Bockius LLP

(57) ABSTRACT

Disclosed are a neuromorphic device and a unit synapse devices forming the same. The unit synapse device has a learning device and an inference device. The learning device and the inference device may share a via oxide layer and a common electrode, and a learning operation and an inference operation may be performed in one unit synapse device.

6 Claims, 4 Drawing Sheets

NEUROMORPHIC DEVICE AND UNIT SYNAPSE DEVICE FORMING THE SAME

CROSS-REFERENCE TO RELATED APPLICATION

This application claims priority to Korean Patent Application No. 2021-0062037 filed on May 13, 2021 in the Korean Intellectual Property Office (KIPO), the entire contents of which are hereby incorporated by reference.

BACKGROUND

1. Technical Field

Example embodiments of the present invention relate to a neuromorphic device and, more particularly, to a neuromorphic device having both of an inference function and a learning function and a unit synapse device forming the same.

2. Related Art

A neuromorphic device is a semiconductor device proposed with the goal of mimicking human cranial nerves. Neurons and synapses constituting cranial nerves are formed using semiconductor devices to suit an operational specification. In particular, synapses form weights for repetitive stimuli. That is, the repetitive stimuli appear in a constant state, which corresponds to a learning operation, and an operation in which a weight is formed with respect to learned information needs to be understood as an inference operation.

In order to implement this as a device, a resistive random access memory (RRAM), which is a resistive memory, is used. However, depending on the configuration and operating characteristics of a resistive memory, the resistive memory may be used for the learning operation or the inference operation.

For example, an interface RRAM (I-RRAM) device is used for the learning operation. This is due to the fact that the I-RRAM device has a structure of reactive metal, metal oxide, and metal and implements a wide variety of conductance states through an interfacial reaction between the reactive metal and the metal oxide.

Also, a conductive bridge RAM (CBRAM) in which a filament is formed has a structure of ion supplying metal, metal oxide, and metal and has an operation in which a conductive filament is formed in the metal oxide. The CBRAM has excellent characteristics of preserving a conductive filament even when power is removed, and thus it is possible to implement a stable inference operation.

However, the aforementioned I-RRAM has a disadvantage in that a preset conductivity state changes when power is removed, and the aforementioned CBRAM has a disadvantage in that achievable conductivity is small.

For the implementation of a synaptic device, the aforementioned I-RRAM is used to implement the learning operation, and the CBRAM is used to implement the reasoning operation. That is, a synaptic device is composed of a learning unit and an inference unit, and different memory devices are designed to implement the learning unit and the inference unit.

FIG. 1 includes a schematic diagram of a conventional neural network and a conceptual diagram showing a corresponding hardware structure.

Referring to FIG. 1, a synapse connecting unit neurons is disposed between a first neuron group 10 and a second neuron group 20. The schematic diagram of a neural network represented on the left side of FIG. 1 is implemented by hardware in which four word lines W1, W2, W3, and W4, four bit lines B1, B2, B3, and B4, and resistive switching memory devices are disposed. The resistive switching memory devices are modeled as variable resistance devices.

One neuron in the left drawing of FIG. 1 is not disclosed in the right drawing of FIG. 1, and only lines electrically connected to neurons are shown. Also, lines extending in the X-axis direction correspond to word lines W1, W2, W3, and W4, and lines extending in the Y-axis direction are called bit lines B1, B2, B3, and B4. In the hardware configuration, the word lines W1, W2, W3, and W4 and the bit lines B1, B2, B3, and B4 perpendicularly intersect each other, and synapse devices are arranged in the form of variable resistors and between the word lines W1, W2, W3, and W4 and the bit lines B1, B2, B3, and B4 in the intersection areas. Weights are implemented by the synapse devices.

The synapse devices that are disposed between the word lines W1, W2, W3, and W4 and the bit lines B1, B2, B3, and B4 to implement the weights are not produced as a signal device. That is, the synapse devices need to perform a learning operation and an inference operation. Therefore, hardware for implementing a neural network needs to be separately provided with a learning unit, an inference unit, and an interface circuit between the learning unit and the inference unit.

FIG. 2 is a block diagram showing a neural network circuit according to a conventional technique.

Referring to FIG. 2, the neural network circuit includes a learning unit 30, an interface unit 40, and an inference unit 50.

A learning operation is performed through the learning unit 30 first, and then a first weight corresponding to the learning operation is generated. The first weight is implemented as an I-RRAM disposed in the learning unit 30, and one I-RRAM device is modeled as one variable resistor. The generated first weight is delivered to the interface unit 40. The generated first weight may have a different value for each time section depending on a stimulus applied to the learning unit 30. Therefore, a variable resistance device included in the learning unit 30 needs to be a device capable of implementing various values of resistance corresponding to various stimuli.

The first weight input to the interface unit 40 may have a plurality of values for each time section. The interface unit 40 outputs a value having a high frequency and converging to a specific value among the values of the first weight, and the output specific weight value is input to the inference unit 50.

The specific weight value input to the inference unit 50 is converted into a second weight by the CBRAM, which is a variable resistor. As a result, the inference unit 50 stores a specific weight and preserves a programmed weight even if power is removed.

As described above, a synapse circuit is divided into the learning unit 30 responsible for the learning operation and the inference unit 50 responsible for the inference operation. That is, at least two functional blocks are required and separated from each other. This is very inefficient and causes a problem of occupying an excessive area when manufacturing a semiconductor device.

Also, since the I-RRAM and the CBRAM, which are modeled as variable resistance devices, cannot be manufactured in the same process, the number of processes is greatly increased and productivity is reduced in the manufacturing process.

SUMMARY

Accordingly, example embodiments of the present invention are provided to substantially obviate one or more problems due to limitations and disadvantages of the related art.

Example embodiments of the present invention provide a neuromorphic device capable of implementing a learning operation and an inference operation in one array.

Example embodiments of the present invention also provide a unit synapse device included in the neuromorphic device provide by achieving the above technical object.

In some example embodiments, a neuromorphic device includes a synapse array having unit synapse devices formed in regions where a plurality of word line pairs and a plurality of bit lines intersect each other, a bit line control unit connected to the bit lines, and a word line control unit connected to the plurality of word line pairs, wherein one of the word line pairs is connected to the unit synapse device, and the unit synapse device is formed in the same one stack structure.

In other example embodiments, a unit synapse device includes a cumulative stack portion formed on a substrate, and a through-hole portion formed through the cumulative stack portion, wherein the through-hole portion has a via oxide layer in contact with the cumulative stack portion and a common electrode configured to fill the inside of the via oxide layer, and a learning operation or an inference operation is performed.

BRIEF DESCRIPTION OF DRAWINGS

Example embodiments of the present invention will become more apparent by describing example embodiments of the present invention in detail with reference to the accompanying drawings, in which.

DESCRIPTION OF EXAMPLE EMBODIMENTS

Figure 1:
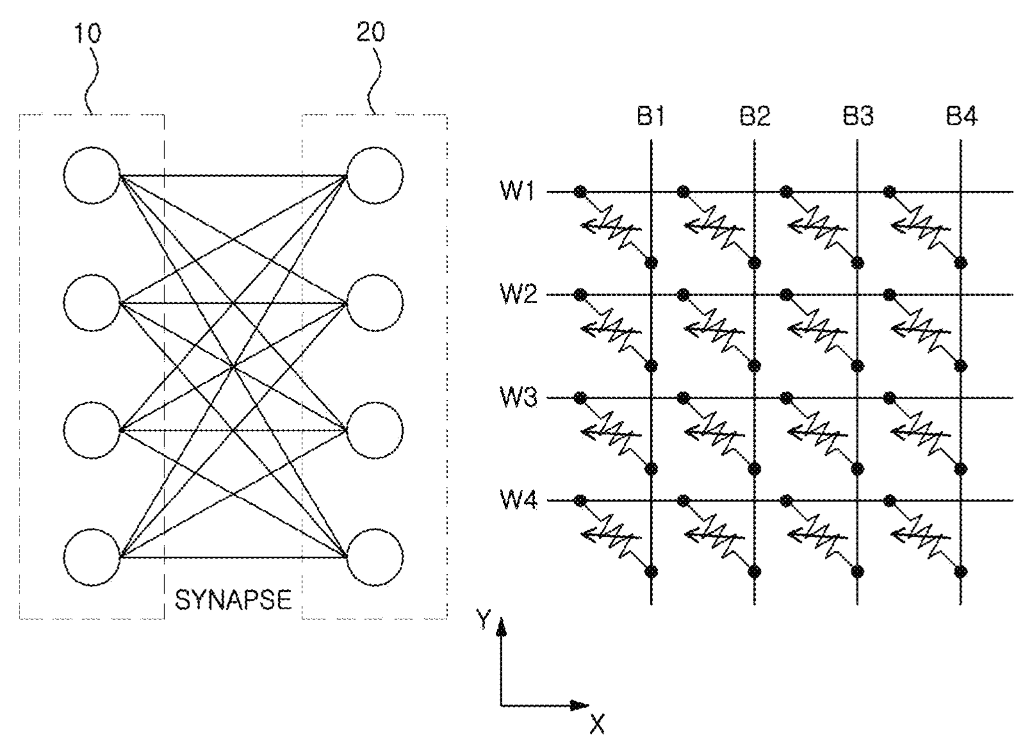
FIG. 1 includes a schematic diagram of a conventional neural network and a conceptual diagram showing a corresponding hardware structure.
Figure 2:
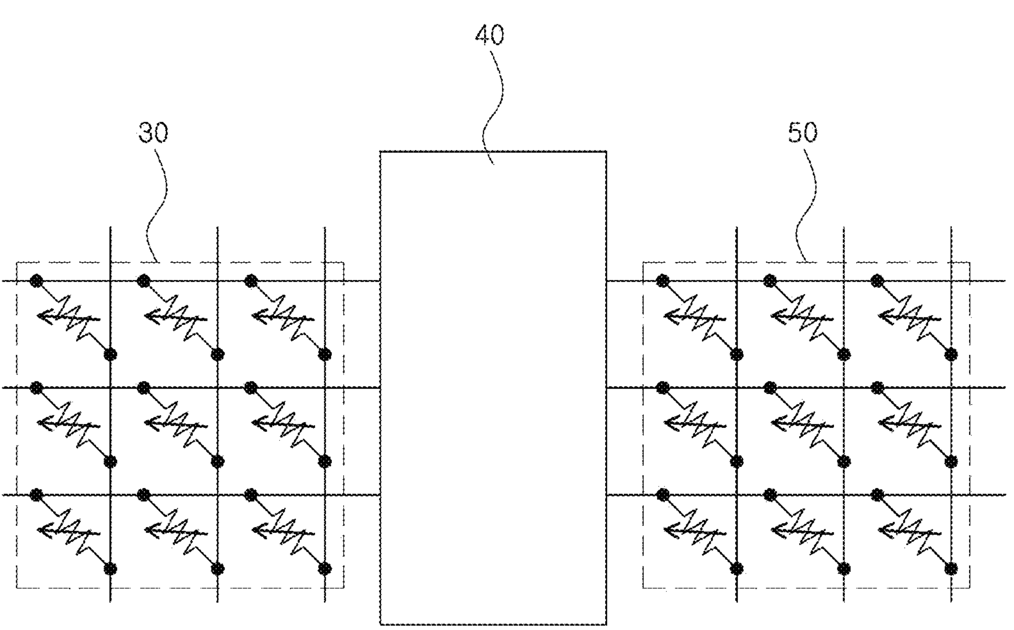
FIG. 2 is a block diagram showing a neural network circuit according to a conventional technique.

While the invention is susceptible to various modifications and alternative forms, specific embodiments thereof will be described in detail and shown by way of example. It should be understood, however, that there is no intent to limit the invention to the particular forms disclosed, but on the contrary, the invention is to cover all modifications, equivalents, and alternatives falling within the spirit and scope of the invention. In describing each drawing, like reference numerals are used for like elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in more detail with reference to the accompanying drawings.

EMBODIMENTS

Figure 3:
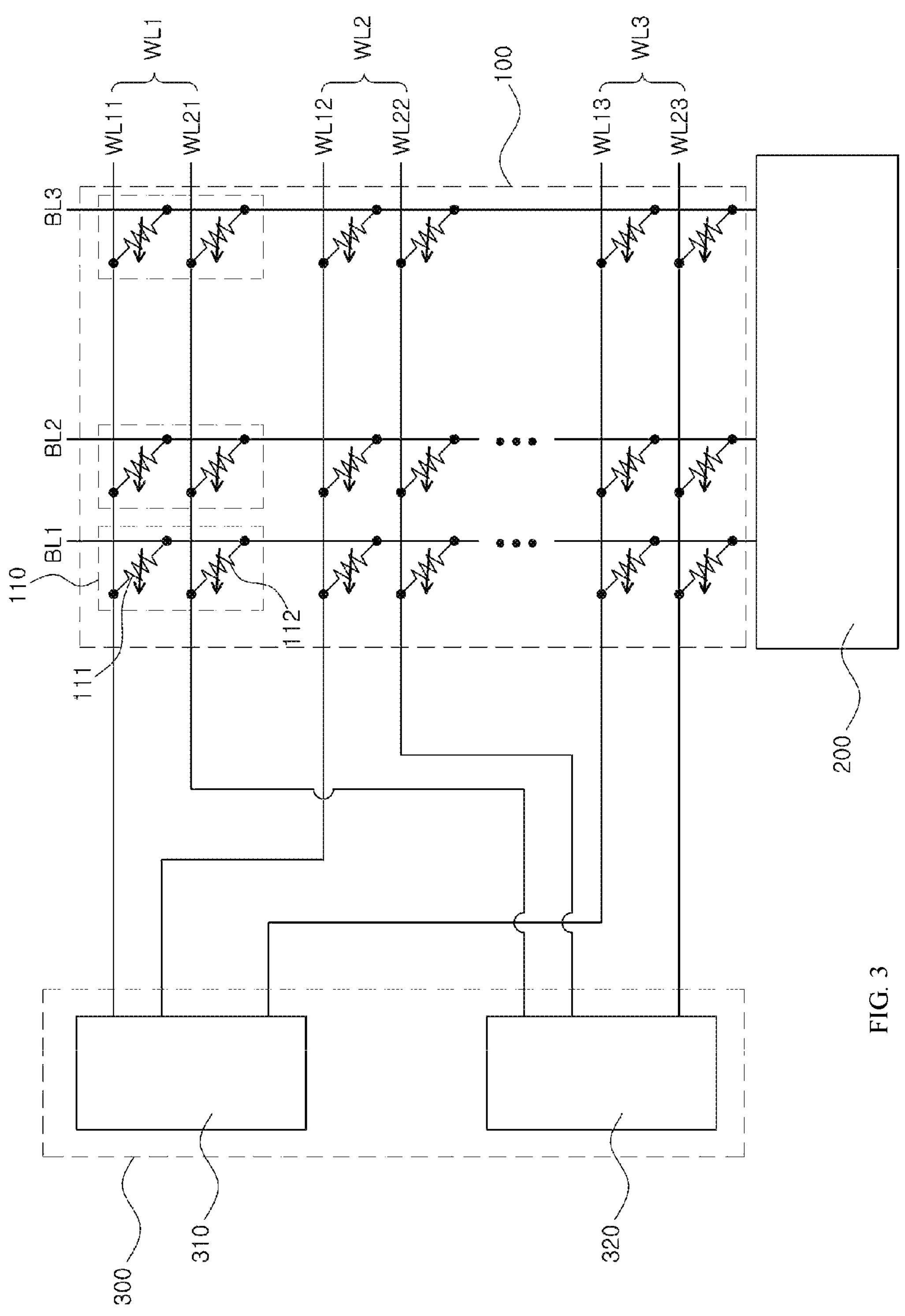
FIG. 3 is a block diagram showing a neuromorphic device according to an exemplary embodiment of the present invention.

FIG. 3 is a block diagram showing a neuromorphic device according to an exemplary embodiment of the present invention.

Referring to FIG. 3, a neuromorphic device has a synapse array 100, a bit line control unit 200, and a word line control unit 300.

The synapse array 100 has a plurality of word line pairs WL1, WL2, and WL3, a plurality of bit lines BL1, BL2, and BL3, and a plurality of unit synapse devices 110. The unit synapse devices 110 are arranged in areas where the word line pairs WL1, WL2, and WL3 and the bit lines BL1, BL2, and BL3 intersect each other and are connected to the word line pairs WL1, WL2, and WL3 and the bit lines BL1, BL2, and BL3.

The word line pairs WL1, WL2, and WL3 include first word lines WL11, WL12, and WL13 and second word lines WL21, WL22, and WL23, and the second word lines WL21, WL22, and WL23 are arranged adjacent to the first word lines WL11, WL12, and WL13. The first word lines WL11, WL12, and WL13 and the second word lines WL21, WL22, and WL23 form the word line pairs WL1, WL2, and WL3, respectively. For example, the word lines WL11 and WL21 form the first word line pair WL1, the word lines WL12 and WL22 form the second word line pair WL2, and the word lines WL13 and WL23 form the third word line pair WL3. The word line pairs WL1, WL2, and WL3 are connected to the word line control unit 300.

The bit lines BL1, BL2, and BL3 are formed to perpendicularly intersect the plurality of word line pairs WL1, WL2, and WL3. Also, the bit lines BL1, BL2, and BL3 are connected to the bit line control unit 200.

The unit synapse device 110 is connected to areas where the bit lines BL1, BL2, and BL3 intersect the word line pairs WL1, WL2, and WL3. The unit synapse device 110 has a learning device 111 and an inference device 112 and has variable resistance characteristics. The learning device 111 and the inference device 112 are formed in the same one stack structure.

Also, the learning device 111 performs a resistive switching operation in response to a stimulus applied through the first word lines WL11, WL12, and WL13. If stimuli are applied in time-series, an interface resistive random access memory (I-RRAM) structure capable of implementing various resistance states corresponding to various stimuli may be used as the learning device 111.

That is, the stimuli applied through the first word lines WL11, WL12, and WL13 are stored as weights, and the weights are implemented as resistance values in the learning device 111. The implementation of the resistance value is expressed by the learning device 111 generating or storing weight information. However, since the I-RRAM implementing the learning device 111 has a problem in that stored weight information is damaged when power is removed, the weight information needs to be transferred to the inference device 112. Weight information generated and stored by the learning device 111 is referred to as a first weight.

The inference device 112 included in the unit synapse device 110 is formed in the same stack structure as the learning device 111. The inference device 112 may have a stack structure of a conductive bridge RAM (CBRAM). Also, the inference device 112 is connected between the second word lines WL21, WL22, and WL33 and the bit lines BL1, BL2, and BL3. A second weight corresponding to specific weight information among weight information generated and stored by the learning device 111 is programmed and stored in the inference device 112. Also, the inference device 112 has an advantage in that the second weight is preserved even when power is removed.

The bit lines BL1, BL2, and BL3 constituting the synapse array are connected to the bit line control unit 200. The first weight, which is weight information generated and stored by learning devices 111 constituting each unit synapse device 110, is input to the bit line control unit 200 through the bit lines BL1, BL2, and BL3. The bit line control unit 200 receives the weight information of the learning devices 111 input through the plurality of bit lines BL1, BL2, and BL3 and acquires the second weight through an operation of selecting weight information having the highest frequency or converging to a specific value among the received weight information. The selected or acquired second weight is input to and stored in the inference device 112 through the bit lines BL1, BL2, and BL3.

The first word lines WL11, WL12, and WL13 and the second word lines WL21, WL22, and WL23 are connected to the word line control unit 300. The word line control unit 300 has a first word line control unit 310 and a second word line control unit 320. The first word line control unit 310 is connected to the first word lines WL11, WL12, and WL13, and the second word line control unit 320 is connected to the second word lines WL21, WL22, and WL23.

The first word line control unit 310 applies a stimulus necessary for the learning operation to the learning device 111 through the first word lines WL11, WL12, and WL13. Thus, the first weight is generated in the learning device 111. The generated first weight is input to the bit line control unit 200 through the bit lines BL1, BL2, and BL3.

The second word line control unit 320 is connected to the second word lines WL21, WL22, and WL23. The second word line control unit 320 applies a bias so that the second weight formed by the bit line control unit 200 can be programmed or stored in a corresponding inference device 112. That is, the second weight generated by the bit line control unit 200 needs to be stored in the inference device 112. To this end, the bit line control unit 200 applies a negative voltage (or positive voltage) corresponding to the second weight, and the second word line control unit 320 applies a positive voltage (or negative voltage) to the inference device 112 through the second word lines WL21, WL22, and WL23 to cause a resistive switching operation of the inference device 112 to be performed. Also, the second word line control unit 320 serves as a terminal from which the second weight stored in the inference device 112 is output.

Figure 4:
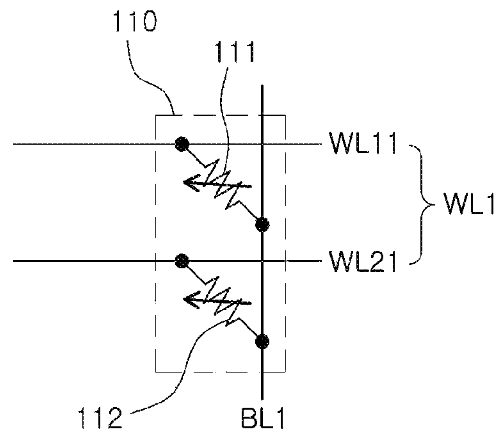
FIG. 4 is a circuit diagram illustrating the operation of a unit synapse device of FIG. 3 according to an exemplary embodiment of the present invention.

FIG. 4 is a circuit diagram illustrating the operation of a unit synapse device of FIG. 3 according to an exemplary embodiment of the present invention.

Referring to FIG. 4, the unit synapse device 110 has a learning device 111 and an inference device 112. For convenience of description, it is assumed that the unit synapse device 110 is connected to the first word line pair WL1 and the first bit line BL1.

A stimulus is applied through the first word line WL11. The stimulus may be applied in time series. A program operation is performed in which the resistance of the learning device 111 is changed according to the applied stimulus. The resistance value of a specific state in the learning device 111 corresponds to weight information. Thus, the first weight is stored in the learning device 111.

The first weight is input to the bit line control unit through the first bit line BL1. It is obvious that the first weight is input in the form of voltage or current. The first weight input to the bit line control unit has time-series characteristics. That is, the first weight may have a different value for each time section. The bit line control unit selects a specific weight value from the first weight varying in time series and chooses the specific weight value as the second weight. This is expressed as an operation of forming the second weight.

Subsequently, an operation of storing the second weight is performed through the bit line control unit. A voltage is applied to the inference device 112 through the first bit line BL1 connected to the bit line control unit, and a resistive switching operation of the inference device 112 is induced. Thus, the second weight is stored in the inference device 112.

In a subsequent process, a read operation on the second weight stored in the inference device 112 may be performed by utilizing the second word line WL21 and the first bit line BL1.

Figure 5:
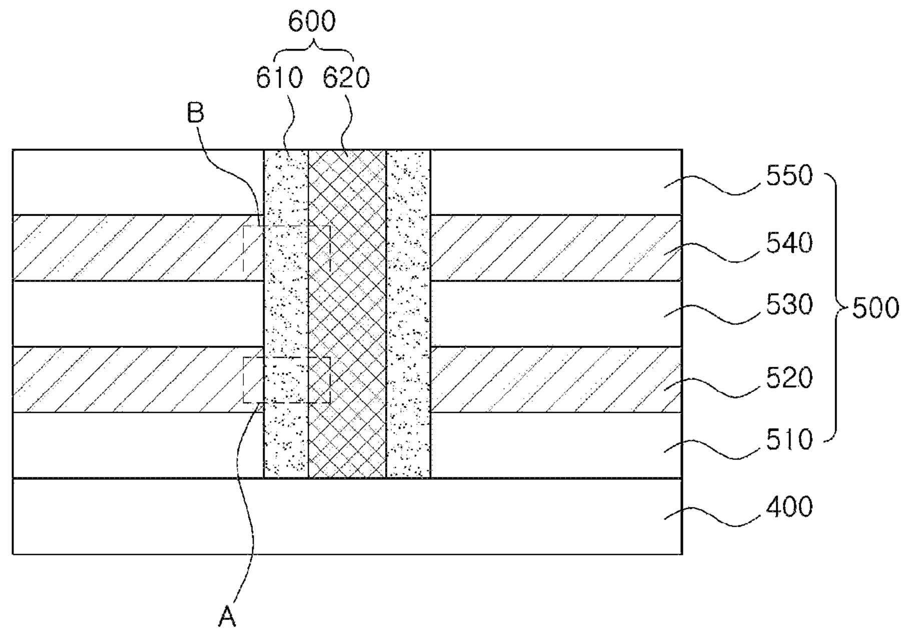
FIG. 5 is a cross-sectional view showing a unit synapse device of FIG. 1 according to an exemplary embodiment of the present invention.

FIG. 5 is a cross-sectional view showing a unit synapse device of FIG. 1 according to an exemplary embodiment of the present invention.

Referring to FIG. 5, a unit synapse device has a cumulative stack portion 500 formed on a substrate 400 and a through-hole portion 600 formed through the cumulative stack portion 500.

The cumulative stack portion 500 has a first interlayer dielectric 510, a first functional metal layer 520, a second interlayer dielectric 530, a second functional metal layer 540, and a third interlayer dielectric 550, which are formed on the substrate 400.

The substrate 400 is not particularly limited, but may be made of a material capable of maintaining physical properties even in the process of forming an oxide- or nitride-based interlayer dielectric. Therefore, the substrate 400 may be made of silicon or silicon oxide.

The first interlayer dielectric 510 formed on the substrate 400 is made of an insulating material and needs to be made of a material capable of maintaining physical properties even when the functional metal layers 520 and 540 are formed thereon. Therefore, the first interlayer dielectric 510 may include silicon oxide or silicon nitride. In addition, an interlayer dielectric material used in a typical semiconductor manufacturing process may be used.

The first functional metal layer 520 is formed on the first interlayer dielectric 510. The first functional metal layer 520 includes oxygen-reactive metal. For example, the first functional metal layer 520 may contain Mo, Ti, or Al. When oxygen ions are transferred from an oxide, the oxygen-reactive metal reacts with the oxygen ions at an interface with the oxide to form a new oxide layer. However, there is a problem in that a new oxide formed by the oxidation of metal is easily reduced under conditions such as power removal.

The second interlayer dielectric 530 is formed on the first functional metal layer 520. The second interlayer dielectric 530 may have the same material as the first interlayer dielectric 510. Insulation between the first functional metal layer 520, which is disposed below, and the second functional metal layer 540, which is disposed above, may be maintained by the second interlayer dielectric 530, and the first functional metal layer 520 and the second functional metal layer 540 may behave independently of each other.

The second functional metal layer 540 is formed on the second interlayer dielectric 530. The second functional metal layer 540 has an ion source metal. Accordingly, the second functional metal layer 540 may have Ag, Cu, Te, CuTe, or AgTe. When the second functional metal layer 540 is an ion source metal, the second functional metal layer 540 may come into contact with an oxide and supply metal ions to the oxide to form a conductive metal filament.

The third interlayer dielectric 550 is formed on the second functional metal layer 540. The third interlayer dielectric 550 may be formed of the same material as the first interlayer dielectric 510 and the second interlayer dielectric 530. However, the material of the three types of interlayer dielectrics 510, 530, and 550 may be freely selected as long as they can secure insulation between the upper or lower functional metal layers 520 and 540.

A through-hole portion 600 is formed through the cumulative stack portion 500 and has a via oxide layer 610 and a common electrode layer 620. The via oxide layer 610 and the common electrode layer 620 extend in a direction perpendicular to the surface of the substrate 400. That is, while the stacks of the cumulative stack portion 500 are formed in a direction parallel to the surface of the substrate 400 and stacked in the upper direction of the substrate 400, the through-hole portion 600 is formed in a direction perpendicular to the surface of the substrate 400.

The via oxide layer 610 is in direct contact with the cumulative stack portion 500 and has a metal oxide material. Accordingly, the via oxide layer 610 is in direct contact with the first functional metal layer 520 and the second functional metal layer 540. Also, the via oxide layer 610 is formed to completely surround the common electrode 620.

The common electrode 620 filling a cavity in the via oxide layer 610 is formed of an inactive metal material. In this embodiment, the inactive metal material refers to a material that does not have reactivity with oxygen ions or metal ions. Reactivity with oxygen ions refers to a reaction of forming a metal oxide or the like by chemically combining the oxygen ions with an inert metal material. Also, reactivity with metal ions refers to the formation of a new material in the form of an alloy by reacting the metal ions with an inert metal. Examples of the inert metal include Pt, TiN, W, or the like.

Also, the first functional metal layer 520 and the second functional metal layer 540 may be formed by changing positions. For example, the first functional metal layer 520 may be formed as an ion source metal material, and the second functional metal layer 540 may be formed as an oxygen-reactive metal material.

In the above structure, the first functional metal layer 520, the via oxide layer 610, and the common electrode 620 constitute a learning device. That is, the first functional metal layer 520, the via oxide layer 610, and the common electrode 620 have the configuration of I-RRAM provided as the learning device. Also, the second functional metal layer 540, the via oxide layer 610, and the common electrode 620 constitute an inference device.

Therefore, the learning device and the inference device share the common electrode 620 and the via oxide layer 610.

The first functional metal layer 520 is electrically connected to the first word line of FIG. 3. Also, the first functional metal layer 520 may serve as the first word line. The second functional metal layer 540 may be electrically connected to the second word line or may serve as the second word line itself. Also, the common electrode 620 may be electrically connected to the bit line or may serve as the bit line itself.

Figure 6A:
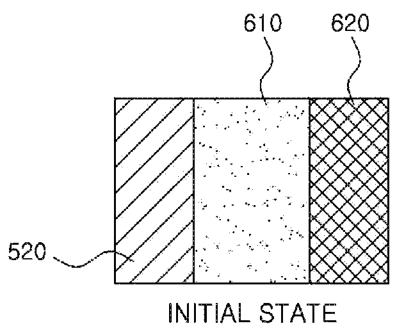
FIGS. 6A-6C include enlarged cross-sectional views of region A of FIG. 5 according to an exemplary embodiment of the present invention.
Figure 6B:
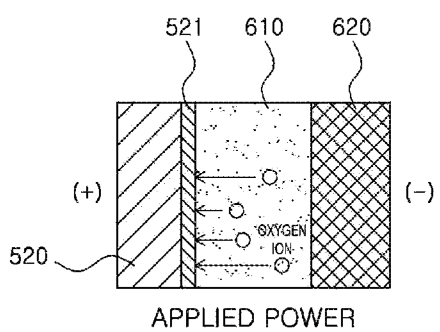
Figure 6C:
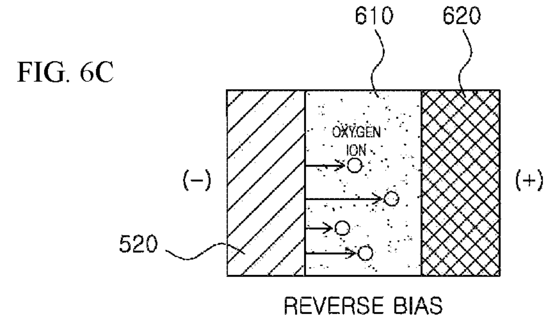

FIGS. 6A-6C include enlarged cross-sectional views of region A of FIG. 5 according to an exemplary embodiment of the present invention.

Referring to FIGS. 6A-6C, a first functional metal layer 520 having an oxygen-reactive metal material, a via oxide layer 610, and a common electrode 620 are disposed in a direction horizontal to a substrate. The first functional metal layer 520 includes an oxygen-reactive metal.

The initial state is a floating state before power is applied, and no remarkable reaction occurs at an interface between the first functional metal layer 520 and the via oxide layer 610.

When a positive voltage is applied to the first functional metal layer 520 and a negative voltage is applied to the common electrode 620, oxygen ions in the via oxide layer 610 are released from the bond with the metal and are moved to the first functional metal layer 520 by an applied electric field. For reference, in this embodiment, a positive voltage and a negative voltage need to be understood as a configuration for applying a difference therebetween to both ends. The oxygen ions moved to the first functional metal layer 520 form an oxide layer 521 on the surface of the first functional metal layer 520. Also, an oxygen ion vacancy is generated in the via oxide layer 610 and serves as a conductive channel. Since the oxygen ion vacancy is formed in a dispersed aspect in the via oxide layer 610, it is possible to realize various conductivity levels depending on an applied electric field. This corresponds to the typical operation of I-RRAM. Also, when a reverse bias is applied between the first functional metal layer 520 and the common electrode 620, the formed oxide layer 521 is reduced, and the oxygen ions fill the vacancies of the via oxide layer 610.

When power is removed between the first functional metal layer 520 and the common electrode 620, the oxide layer 521 formed at the interface is gradually oxidized, and thus it is difficult to maintain an implemented resistance state. That is, even if an electric field corresponding to a stimulus is applied to the via oxide layer 610 for a learning operation and a first weight is stored, it is difficult to preserve the first weight when power is removed.

Figure 7A:
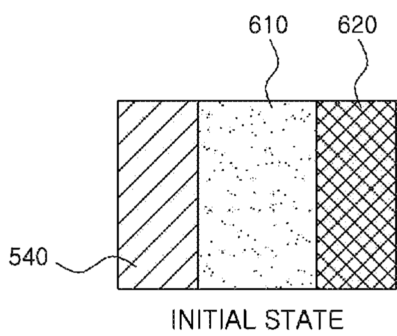
FIGS. 7A-7C include enlarged cross-sectional views of region B of FIG. 5 according to an exemplary embodiment of the present invention.
Figure 7B:
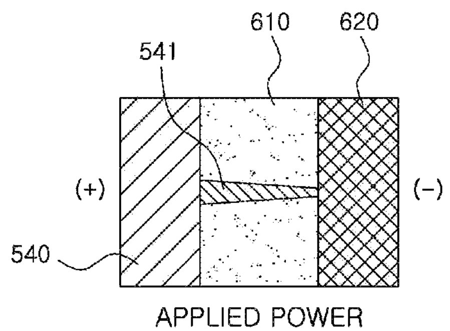
Figure 7C:
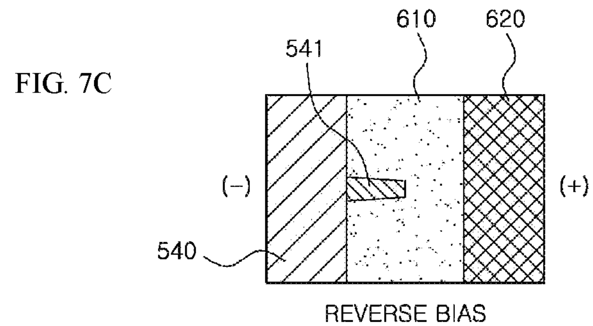

FIGS. 7A-7C include enlarged cross-sectional views of region B of FIG. 5 according to an exemplary embodiment of the present invention.

Referring to FIGS. 7A-7C, a second functional metal layer 540, a via oxide layer 610, and a common electrode 620 are disposed. The second functional metal layer 540 has ion source metal.

In a floating state in which no power is applied, the behavior of a special material does not appear in the via oxide layer 610.

When a positive voltage is applied to the second functional metal layer 540 and a negative voltage is applied to the common electrode 620, the second functional metal layer 540 serves as a source of metal cations. Accordingly, metal cations move into the via oxide layer 610, which is amorphous, to form a conductive filament 541 made of metal.

When a reverse bias is applied between the second functional metal layer 540 and the common electrode 620, the metal cations forming the conductive filament 541 are moved to the second functional metal layer 540 and then reduced. Thus, the conductive filament is removed.

In the above operation, the conductive filament is formed in a specific region of the via oxide layer 610, and thus it is difficult to implement various resistance states. However, since the conductive filament is not reduced even when power is removed, the set resistance state is easily maintained. That is, it may be used as an inference device.

Referring back to FIG. 5, one unit synapse device has a learning device and an inference device implemented in one stack structure.

First, a voltage difference is applied between the first functional metal layer corresponding to the learning device and the common electrode, and oxygen vacancies are generated in region A, which is a specific region of the via oxide layer disposed between the first functional metal layer and the common electrode. Also, a resistance state is implemented. This is interpreted as a learning operation for a stimulus applied in time series. The resistance state changed by the learning operation corresponds to weight information. Also, when a constant voltage or a constant current is applied through the first functional metal layer, a specific amount of current or a specific voltage is generated through the common electrode, which corresponds to a first weight. The first weight information is input to the bit line control unit of FIG. 1 through the bit line connected to the common electrode.

The bit line control unit generates a second weight and inputs and stores the second weight to and in the inference device. To this end, a first functional metal layer corresponding to the learning device may be floated, and a voltage difference for storing the second weight is applied to the common electrode and the second functional metal layer corresponding to the inference device. Accordingly, a conductive filament is formed in region B, which is a specific region disposed between the second functional metal layer and the common electrode. Thus, the transfer operation of the weights is completed.

In FIG. 3, the common electrode corresponds to an output terminal during the learning operation and the transfer of the weight information to the bit line. Also, when the weight information is delivered to the inference device through the bit line for the inference operation, the common electrode corresponds to an input terminal. Also, the via oxide layer, which has a single film, has oxygen vacancies and conductive metal filaments depending on the first functional metal layer and the second functional metal layer disposed on the side surfaces.

According to the present invention described above, the learning device and the inference device are implemented in one unit synapse device. Also, the learning operation and the inference operation may be implemented in one array. Accordingly, the area of the array is remarkably reduced compared to a conventional case in which the learning unit and the inference unit are spaced apart from each other. Also, the learning device and the inference device may share the same bit line. Accordingly, it is possible to decrease the number of metal lines compared to separately forming bit lines in the learning device and the inference device.

In particular, as the learning operation and the inference operation are performed within the same unit synapse device, the transfer of the weight information may be performed in the same device, and thus the weight information can be accurately transferred.

While the example embodiments of the present invention and their advantages have been described in detail, it should be understood that various changes, substitutions and alterations may be made herein without departing from the scope of the invention.

What is claimed is:

1. A unit synapse device, comprising:

a cumulative stack portion formed on a substrate; and a through-hole portion formed through the cumulative stack portion, wherein the through-hole portion has a via oxide layer in contact with the cumulative stack portion and a common electrode configured to fill an inside of the via oxide layer, and a learning operation or an inference operation is performed, wherein the cumulative stack portion comprises:

a first functional metal layer formed on the substrate and having oxygen-reactive metal;

a second interlayer dielectric formed on the first functional metal layer; and a second functional metal layer having ion source metal formed on the second interlayer dielectric, wherein the first functional metal layer, the via oxide layer, and the common electrode have a configuration of an interface random access memory (I-RAM) and serve as a learning device for performing the learning operation, and wherein the second functional metal layer, the via oxide layer, and the common electrode have a configuration of a conductive bridge random access memory (CBRAM) and serve as an inference device for performing the inference operation.

2. The unit synapse device of claim 1, wherein the first functional metal layer is electrically connected to a first word line, the second functional metal layer is electrically connected to a second word line, and the common electrode is electrically connected to a bit line.

3. The unit synapse device of claim 2, wherein a first weight is stored in the learning device through the first word line, the first weight is output through the bit line, and a second weight selected among first weights is transferred to the inference device through the bit line.

4. The unit synapse device of claim 1, wherein the learning device and the inference device share the via oxide layer and the common electrode.

5. The unit synapse device of claim 1, wherein an oxygen ion vacancy is formed inside the via oxide layer by a voltage applied between the first functional metal layer and the common electrode, and an oxide layer is formed on a surface of the first functional metal layer.

6. The unit synapse device of claim 1, wherein a conductive filament is formed inside the via oxide layer by a voltage applied between the second functional metal layer and the common electrode.

* * * * *